(12) United States Patent
Attalin

(10) Patent No.: US 10,743,969 B2
(45) Date of Patent: Aug. 18, 2020

(54) REMOVABLE DENTAL PROSTHESIS AND METHOD OF MANUFACTURING SAID REMOVABLE DENTAL PROSTHESIS

(71) Applicant: TOUT DENTAIRE, Rueil Malmaison (FR)

(72) Inventor: Rémy Attalin, Rueil Malmaison (FR)

(73) Assignee: TOUT DENTAIRE, Rueil Malmaison (FR)

( * ) Notice: Subject to any disclaimer, the term of this patent is extended or adjusted under 35 U.S.C. 154(b) by 0 days.

(21) Appl. No.: 15/643,546

(22) Filed: Jul. 7, 2017

(65) Prior Publication Data

US 2018/0008385 A1 Jan. 11, 2018

(30) Foreign Application Priority Data

Jul. 8, 2016 (FR) ...................................... 16 56607

(51) Int. Cl.
| | |
|---|---|
| *A61C 13/00* | (2006.01) |
| *A61C 9/00* | (2006.01) |
| *A61C 13/10* | (2006.01) |
| *A61C 13/271* | (2006.01) |
| *A61C 13/267* | (2006.01) |
| *A61C 13/34* | (2006.01) |

(52) U.S. Cl.
CPC ........ *A61C 13/0006* (2013.01); *A61C 9/0006* (2013.01); *A61C 13/1003* (2013.01); *A61C 13/26* (2013.01); *A61C 13/267* (2013.01); *A61C 13/34* (2013.01)

(58) Field of Classification Search
CPC ... A61C 13/0006; A61C 13/267; A61C 13/26; A61C 13/1003; A61C 9/0006
USPC ......................................................... 433/178
See application file for complete search history.

(56) References Cited

U.S. PATENT DOCUMENTS

| | | | | |
|---|---|---|---|---|
| 2009/0298018 | A1* | 12/2009 | Bublewitz ............ | A61C 9/0006 433/215 |
| 2011/0183293 | A1* | 7/2011 | Tchouangang ..... | A61C 13/0024 433/213 |
| 2012/0107771 | A1* | 5/2012 | Hrenak ................. | A61C 13/10 433/171 |
| 2014/0220510 | A1* | 8/2014 | Barton ............... | A61C 13/1009 433/178 |

\* cited by examiner

*Primary Examiner* — Matthew M Nelson
(74) *Attorney, Agent, or Firm* — Sughrue Mion, PLLC

(57) ABSTRACT

Method of fabricating a dental prosthesis (1), intended to fill an area of a first jaw, the first jaw being an identical reproduction of at least one part of an edentulous jaw (4) of an individual, the area being capable of receiving at least one tooth (3), the first jaw incorporating a protruding element (11), the method comprising:
a first step of depositing the first portion (5) of a material on the area of the first jaw, in such a way that the first portion of deposited material can be hooked to the projecting element, the material being capable of preserving its shape after deposit;
a step of attaching the tooth to the first portion of the deposited material.

6 Claims, 4 Drawing Sheets

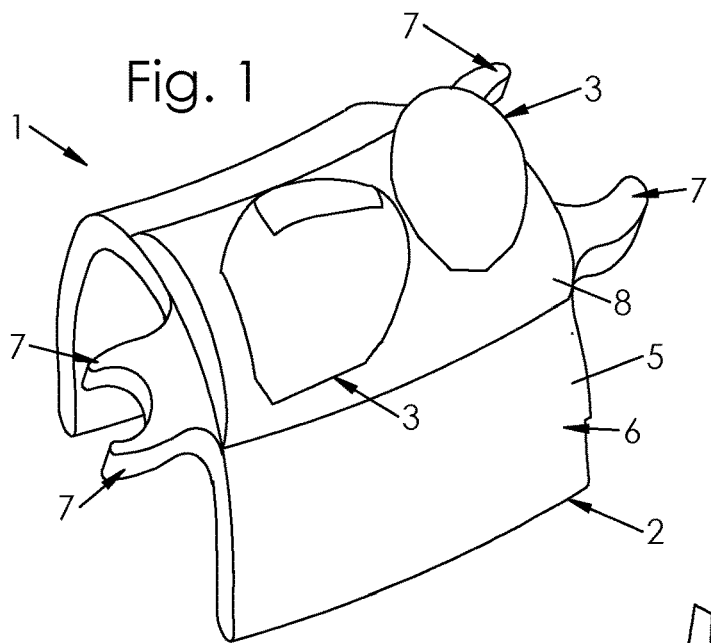
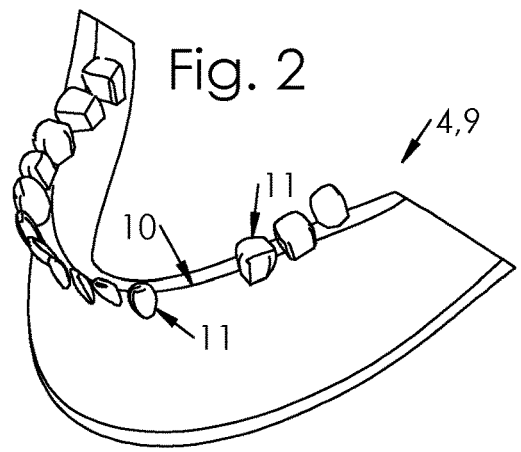
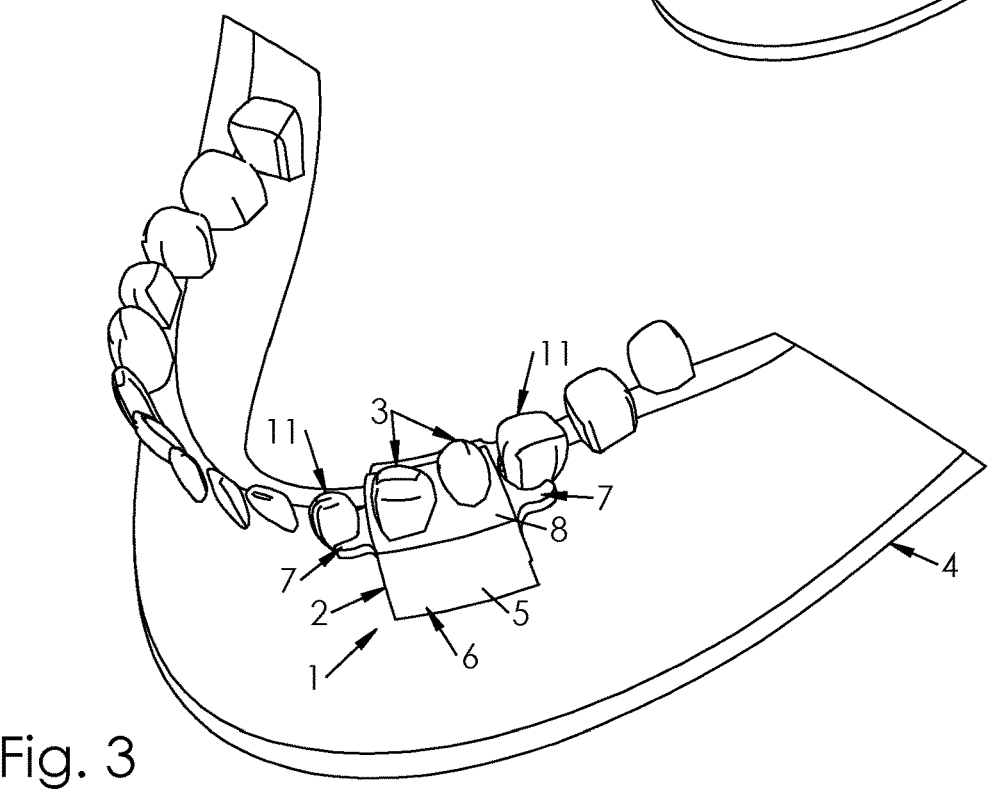

REMOVABLE DENTAL PROSTHESIS AND METHOD OF MANUFACTURING SAID REMOVABLE DENTAL PROSTHESIS

The invention concerns the domain of dental prostheses, and more particularly the fabrication of a removable dental prosthesis.

A completely edentulous individual can no longer chew food. A partially edentulous individual chews with the remaining teeth, which tends to cause premature wear of those teeth.

One solution to enable an edentulous individual to chew food properly proposes that he wear a dental prosthesis to replace the missing teeth.

Dental prostheses are generally custom made by a professional. Dental prostheses can be manufactured by injection, from an impression of the jaw of the edentulous individual. Such method of fabrication requires the individual to go to a competent professional to have the impression made, and requires the individual to wait for the dental prosthesis to be fabricated. This wait can be long, and requires the individual to continue eating soft food or to continue prematurely causing wear of the remaining teeth.

The document US 2004/0248065 describes a dental prosthesis capable of being adapted to be jaw of an edentulous individual, without intervention of a professional. The dental prosthesis comprises a base, generally U-shaped, configured to cooperate with a gum of the individual. The base comprises cavities in which teeth are secured. The dental prosthesis also comprises a reline material, applied to the base, on the side opposite the teeth and closely fitted to the shape of the base. In order to adapt the dental prosthesis to his gum, the edentulous individual dips the dental prosthesis in hot water. The hot water enables the reline material to soften. The individual then positions the prosthesis in his mouth, the reline material pressed against his gum, then tightens the jaw or presses on the dental prosthesis with his fingers until the reline material cools. The reline material thus perfectly fits the shape of the individual's gum, and enables the prosthesis to be maintained on the gum.

Such a dental prosthesis effectively allows an unqualified individual to adapt it to his jaw without using a professional, while reducing the delays since the base of the prosthesis is not custom-made. However, a prosthesis such as the one described in the document US 2004/0248065 is fabricated from a substantially rigid material and is thus easily breakable. Moreover, such a prosthesis is only usable by an individual having one of his two jaws completely edentulous.

A first objective is to propose a method of fabricating a dental prosthesis, said method being able to be implemented without the intervention of a professional, particularly a healthcare professional, the prosthesis obtained by the method enabling an edentulous individual to chew food with all his jaw.

A second objective is to propose a method of fabricating a dental prosthesis configured to be adapted to an individual's jaw without the need for intervention by a professional.

A third objective is to propose a method of fabricating a light and flexible dental prosthesis, improving comfort and reducing the risk of breakage.

A fourth objective is to propose a method of fabricating a dental prosthesis, adaptable to a partially edentulous jaw.

To that end, firstly a method is proposed of fabricating a dental prosthesis, intended to fill an area of the first jaw, the first jaw being an identical reproduction of at least one part of an edentulous jaw of an individual, the area being capable for receiving at least one tooth, the first jaw incorporating a projecting element, the method comprising:
  a first step of depositing the first portion of a material on the area of the first jaw, in such a way that the first portion of deposited material can be hooked to the projecting element, the material being capable for preserving its shape after deposit;
  a step of attaching the tooth to the first portion of the deposited material.

Such a method enables the fabrication of a removable partial dental prosthesis.

This method of fabricating enables an untrained individual to fabricate such a dental prosthesis.

Various additional characteristics can be foreseen, alone or in combination:
  the first portion of material deposited on the area of the first jaw comprises a base and a hook, the base being capable of covering the area of the first jaw and the hook being capable of at least partially encircling the projecting element of the first jaw;
  the method comprises, before the step of attaching the tooth, a second step of depositing a second portion of material on the first portion of material, the attachment of the tooth being performed on the second portion of material;
  the method comprises, after the step of attaching the tooth, a step of placing the first jaw in contact with a second jaw complementary to the first jaw;
  the method comprises, after the first step of depositing, a step of hardening the material;
  the method comprises, before the first step of depositing, a first step of heating the material;
  the method comprises, before the first step of depositing, a first step of coloring the material;
  the material belongs to the family of polycaprolactones.

Secondly, a dental prosthesis is proposed comprising a first portion of a material and at least one tooth, the dental prosthesis being fabricated according to the method presented above.

Thirdly, a kit is proposed comprising:
  a dental prosthesis as previously described;
  an impression tray, an impression material and dental stone enabling a first step of molding as presented above to be performed.

Other characteristics and advantages of the invention will be seen more clearly and specifically from the following description of embodiments, which is provided with reference to the appended drawings in which:

FIG. 1 is a schematic view in perspective of a removable dental prosthesis;

FIG. 2 is a schematic view in perspective of an edentulous jaw of an individual or of a first jaw identically reproducing the edentulous jaw;

FIG. 3 is a schematic view in perspective of the dental prosthesis disposed on an edentulous jaw of an individual;

Figure 4:
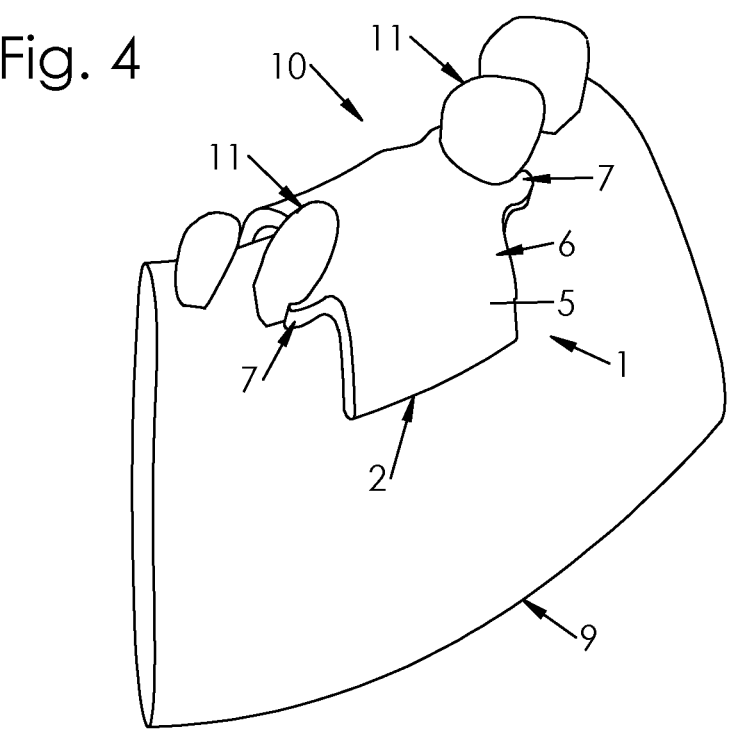
FIG. 4 is a schematic view in perspective of a first step of depositing a first portion of a material on a first jaw.

Represented in FIG. 1 is a dental prosthesis 1 comprising a body 2 and teeth 3 attached to the body 2.

According to a second embodiment, the dental prosthesis 1 comprises two teeth 3. According to embodiments not represented, the dental prosthesis 1 comprises one tooth 3 or more than two teeth 3.

As illustrated in FIG. 3, the prosthesis 1 is intended, according to the embodiment represented, to fill out an edentulous jaw 4 of an individual, the edentulous jaw 4 being represented in FIG. 2.

The edentulous jaw 4 in this instance is the lower jaw of the individual. However, according to embodiments not illustrated, the edentulous jaw 4 is the upper jaw of the individual, an animal jaw or an artificial jaw.

The body 2 of the dental prosthesis 1 is fabricated with a material capable of preserving a specific shape.

According to a preferred embodiment, the material is thermosettable. Advantageously, the material belongs to the family of polycaprolactones.

According to a preferred embodiment, the material is in the form of plates. According to different embodiments, the material is in the form of lumps, granules or tubes.

The body 2 of the dental prosthesis 1 comprises a first portion 5. The first portion 5 comprises a base 6 and four hooks 7. The hooks 7 are suitable for encircling a tooth of the edentulous jaw 4 of the individual.

According to embodiments not represented, the first portion 5 of the body 2 comprises a different number of hooks 7.

The body 2 also comprises a second portion 8 joined to the first portion 5. The teeth 3 are secured to the second portion 8.

According to an embodiment not illustrated, the teeth 3 are attached directly onto the first portion 5.

A method of fabricating such a dental prosthesis 1, whereof the steps are described hereinafter, is illustrated in FIGS. 4 to 7. The steps are described and illustrated in FIG. 8 in their order of performance, according to a preferred embodiment.

According to the preferred embodiment, the method comprises a first step 100 of heating the first portion 5 of material. The material, advantageously belonging to the family of polycaprolactones, is heated so that it becomes malleable. The heating temperature is between 60° C. and 70° C. The heating of the first portion 5 of material is, for example, achieved by means of a hairdryer.

According to different embodiments, the material is heated in an oven, or by immersion in hot water.

The method comprises a first step 200 of coloring the material. The hot material is mixed with colorants in order to give it a color close to the color of a gum of the edentulous jaw 4 of the individual. The colorants used are advantageously of natural origin.

According to different embodiments, the colorants are food type colorants. The material can also be uncolored so as to retain its original color.

The method also comprises a first step 300 of molding a first jaw 9, illustrated in FIG. 2, of at least part of the edentulous jaw 4 of the individual.

The first step 300 of molding comprises a first primary phase 310 of taking an impression, carried out by means of an impression tray and impression material. The impression tray is essentially U-shaped and comprises a trough capable of receiving the impression material. The impression tray and the impression material are then inserted into the mouth of the individual, against the edentulous jaw 4, so that the edentulous jaw 4 sinks into the impression material. Once the impression material has hardened, the impression tray and the impression material are removed from the individual's mouth.

The first step 300 of molding also comprises a second primary phase 320 of pouring dental stone into the impression material, forming a negative of the edentulous jaw 4 of the individual. Once the dental stone has hardened, the impression tray and the impression material are separated from the dental stone. The dental stone then forms the first jaw 9, said jaw being an identical reproduction of the edentulous jaw 4 of the individual.

The first jaw 9 then comprises an area 10 capable of receiving at least one tooth 3. The first jaw 9 also incorporates two projecting elements 11.

According to the embodiment represented, the projecting element 11 is a natural tooth. According to a different embodiment, the first jaw 9 comprises a different number of projecting elements 11. The projecting elements 11 are, for example, a dental appliance, a bridge, a hinged tooth or a crown.

The method comprises a step 400 of defining the area 10 of the first jaw 9. The definition step 400 consists of defining on the first jaw, for example by means of a pen, the perimeter [of] the area 10 of the first jaw 9.

The method also comprises a second step 500 of molding a second jaw 12 of at least one part of a jaw of the individual opposite to the edentulous jaw 4 and complementary thereto.

In this instance, the opposite jaw is the upper jaw of the individual. However, according to embodiments not illustrated, the opposite jaw is the lower jaw of the individual, an animal jaw or an artificial jaw.

The second step 500 of molding comprises a first secondary phase 510 of taking an impression, carried out by means of an impression tray and impression material. The impression tray is essentially U-shaped and comprises a trough capable of receiving the impression material. The impression tray and the impression material are then inserted into the mouth of the individual, against the opposite jaw, so that the opposite jaw sinks into the impression material. Once the impression material has hardened, the impression tray and the impression material are removed from the individual's mouth.

The second step 500 of molding also comprises a second secondary phase 520 of pouring dental stone into the impression material, forming a negative of the edentulous jaw of the individual. Once the dental stone has hardened, the impression tray and the impression material are separated from the dental stone. The dental stone then forms the second jaw 12, said jaw being an identical reproduction of the jaw opposite to the edentulous jaw 4 of the individual.

According to a different embodiment, the first step 300 of molding and the step 400 of definition are performed prior to the first step 100 of heating. The second step 500 of molding is performed prior to the first step 300 of molding.

According to the preferred embodiment, the method comprises a second step 600 of heating the first portion 5 of material. The material, advantageously belonging to the family of polycaprolactones, is heated so that it becomes malleable. The heating temperature is between 60° C. and 70° C. The heating of the first portion 5 of material is, for example, achieved by means of a hairdryer.

According to different embodiments, the material is heated in an oven or by immersion in hot water.

If the first step 300 of molding, the step 400 of definition and the second step 500 of molding are performed prior to the first step 100 of heating, and if the first portion 5 of material is sufficiently malleable after the first step 200 of coloring, the second step 600 of heating is unnecessary.

If the first step 200 of coloring is not performed, the second step 600 of heating is unnecessary.

As illustrated in FIG. 4, the method comprises a first step 700 of depositing the first portion 5 of material on the area 10 of the first jaw 9. The first portion 5 is deposited so that the base 6 does not extend past the perimeter of the area 10 defined in the step 400 of definition and the hooks 7 encircle the projecting elements 11 of the first jaw 9.

According to an embodiment not represented, the first step 300 of molding and the step 400 of definition as well as the second step 500 of molding are not performed and the first portion 5 of material is deposited on the edentulous jaw 4 of the individual, the hooks 7 encircling one tooth of the edentulous jaw 4.

The method comprises a first step 800 of hardening the first portion 5 of material.

According to the preferred embodiment, the first portion 5 of material is dipped into water at ambient temperature, cooling the material and causing its hardening. According to a different embodiment, the first portion 5 of material is cooled by ambient air, causing its hardening.

The method comprises a step 900 of removal of burrs from the first portion 5 of material. The burrs are removed by means of a cutting tool.

The method comprises a step 1000 of repositioning the first portion 5 of material on the first jaw 9.

According to an embodiment not represented, the first step 300 of molding and the step 400 of definition as well as the second step 500 of molding are not performed, and the first portion 5 of material is repositioned on the edentulous jaw 4 of the individual.

The method comprises a third step 1100 of heating the second portion 8 of material. The material, advantageously belonging to the family of polycaprolactones, is heated so that it becomes malleable. The heating temperature is between 60° C. and 70° C. The heating of the second portion 8 of material is, for example, achieved by means of a hairdryer.

According to different embodiments, the material is heated in an oven or by immersion in hot water.

According to a different embodiment, the material heated during the third step 1100 of heating is excess material from the first step 700 of depositing the first portion 5 of material and of the burr removal step 900.

The method comprises a second step 1200 of coloring the material. The hot material is mixed with colorants in order to give it a color close to the color of a gum of the edentulous jaw 4 of the individual. The colorants used are advantageously of natural origin.

According to different embodiments, the colorants are food type colorants. The material can also be uncolored so as to retain its original color.

According to the preferred embodiment, the method comprises a fourth step 1300 of heating the second portion 8 of material. The material, advantageously belonging to the family of polycaprolactones, is heated so that it becomes malleable. The heating temperature is between 60° C. and 70° C. The heating of the second portion 8 of material is, for example, achieved by means of a hairdryer.

According to different embodiments, the material is heated in an oven or by immersion in hot water.

If the second portion 8 of material is sufficiently malleable after the second step 1200 of coloring or if the second step 1200 of coloring is not performed, the fourth step 1300 of heating is unnecessary.

Figure 5:
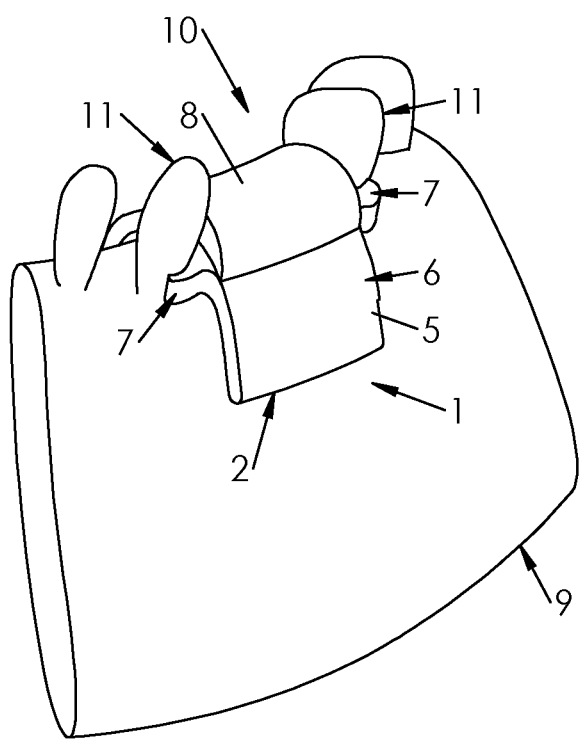
FIG. 5 is a schematic view in perspective of a second step of depositing a second portion of material on the first portion of material.

As illustrated in FIG. 5, the method also comprises a second step 1400 of depositing the second portion 8 of material on the first portion 5. The second portion 8 is deposited in the form of a bead onto the first portion 5.

Figure 6:
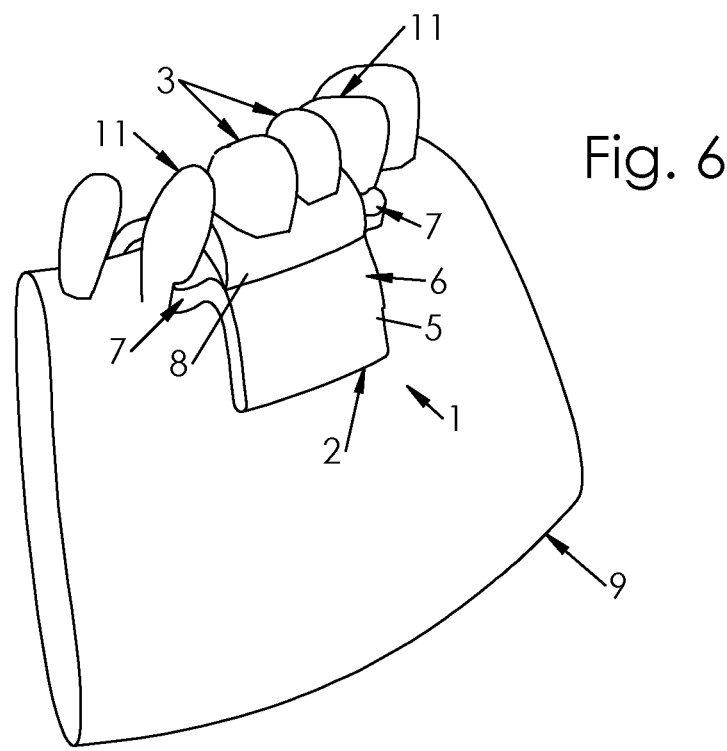
FIG. 6 is a schematic view in perspective of a step of attaching teeth on the second portion of material.

The method comprises a step 1500 of attaching teeth 3 on the second portion 8, represented in FIG. 6. The teeth 3 are inserted into the second portion 8 of material, so as to fill the area 10 of the first jaw 9.

According to a different embodiment, a single tooth 3 is attached during the attachment step 1500. According to a different embodiment, the second step 1400 of depositing the second portion 8 of material is not performed and the teeth 3 are attached in the first portion 5 of material.

According to the preferred embodiment, the teeth 3 are prefabricated. According to a different embodiment, the teeth 3 are custom made during the process of fabricating the dental prosthesis 1.

Figure 7:
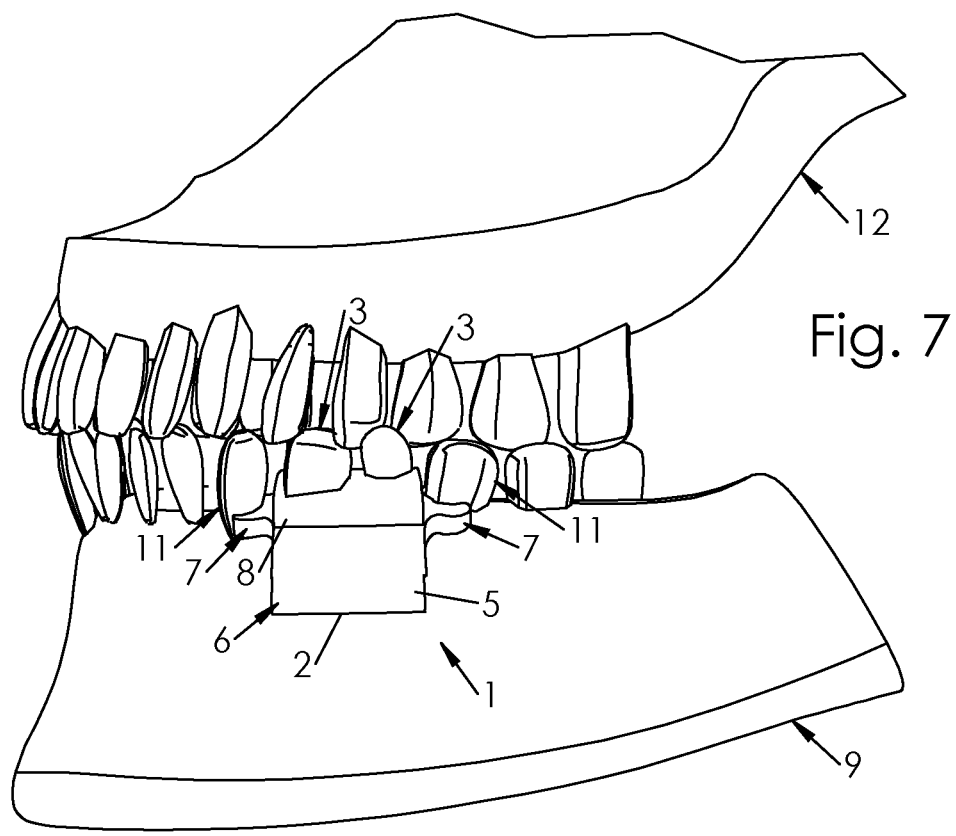
FIG. 7 is a schematic view in perspective of a step of aligning teeth of the dental prosthesis with a second jaw.
Figure 8:
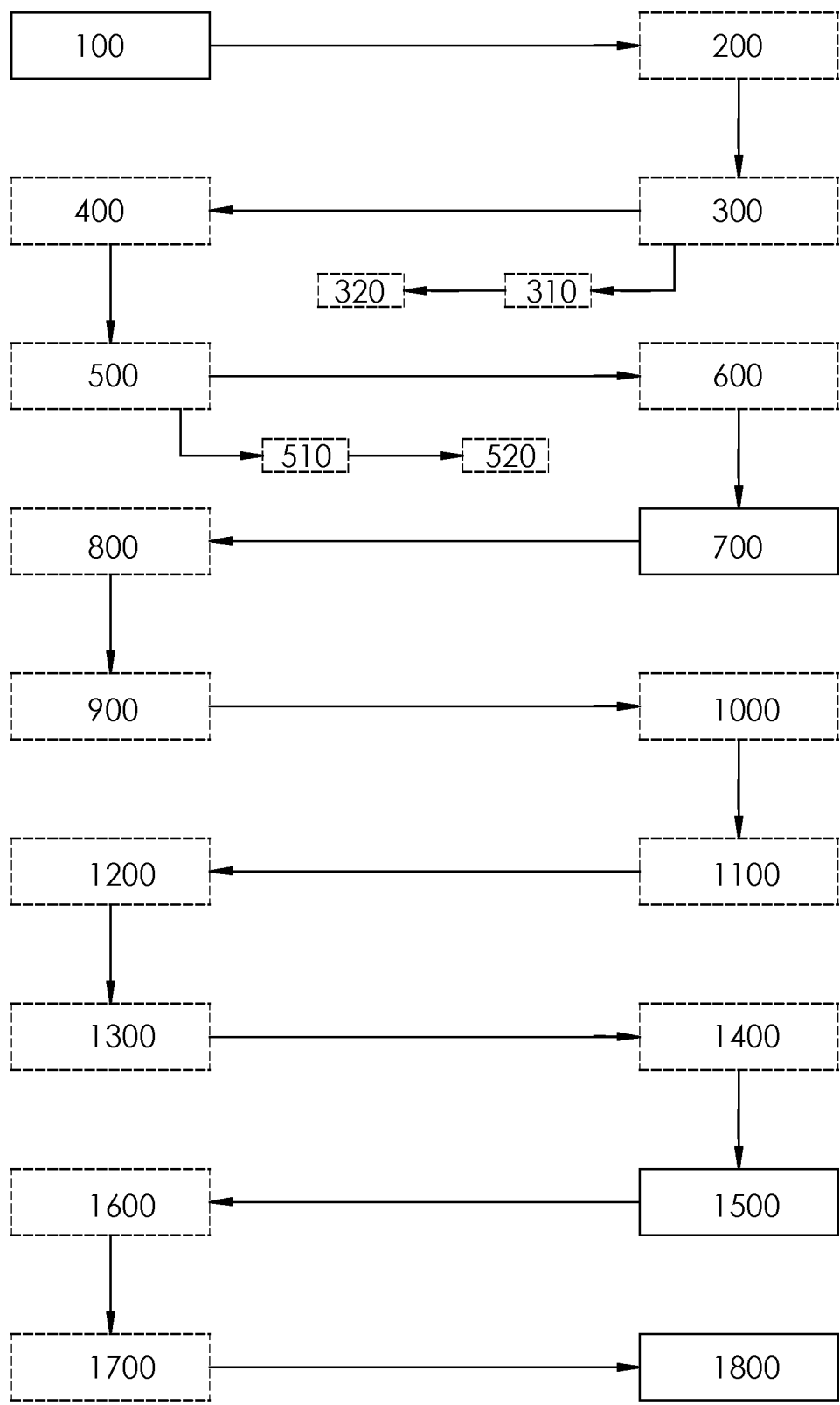
FIG. 8 is a schematic representation illustrating the steps relative to one embodiment of a method of fabricating a removable dental prosthesis.

The method comprises a step 1600 of alignment of the teeth 3 with the second jaw 12, as illustrated in FIG. 7. The second jaw 12 is placed against the first jaw 9, on which the dental prosthesis 1 is positioned, so that the teeth 3 of the dental prosthesis 1 cooperate with the teeth of the second jaw 12.

According to a different embodiment, the dental prosthesis 1 is positioned on the edentulous jaw 4. The step 1600 of alignment of the teeth 3 is performed with the jaw opposite to the edentulous jaw 4 so that the teeth 3 of the dental prosthesis 1 cooperate with the teeth of the jaw opposite to the edentulous jaw 4.

The method comprises a step 1700 of smoothing rough patches of the first portion 5 and of the second portion 8 of the material.

The method comprises a second step 1800 of hardening the dental prosthesis 1.

According to the preferred embodiment, the dental prosthesis 1 is dipped into water at ambient temperature, cooling the material and causing it to harden. According to a different embodiment, the dental prosthesis 1 is cooled by ambient air, causing it to harden.

Such a method enables the fabrication of a removable partial dental prosthesis 1 with biocompatible materials.

Said method of production enables an untrained individual to fabricate such a removable dental prosthesis 1 for an edentulous jaw 4.

The method can be implemented from a kit, comprising the material, at least one tooth 3, the impression tray, the impression material and the dental stone.

The invention claimed is:

1. A method of fabricating a dental prosthesis, intended to fill an area of a first jaw, the first jaw being an identical reproduction of at least one part of an edentulous jaw of an individual, the area being capable of receiving at least one tooth, the first jaw integrating a projecting element, the method comprising:
   a first step of depositing a first portion of a material on the area of the first jaw, in such a way that the first portion of deposited material can be hooked to the projecting element, said material being suitable for preserving its shape after deposit;
   a step of hardening the first portion of material;
   following the step of hardening the first portion of material, a second step of depositing a second portion of said material on the first portion, the second portion is deposited in the form of a bead onto the first portion;
   a step of attaching the tooth on the second deposited portion.

2. The method according to claim 1, wherein the first portion deposited on the area of the first jaw comprises a base and a hook, the base being capable of covering the area of the first jaw and the hook being capable of at least partially encircling the projecting element of the first jaw.

3. The method according to claim 1, comprising, after the step of attaching the tooth, a step of placing the first jaw in contact with a second jaw complementary to the first jaw.

4. The method according to claim 1, comprising, prior to the second step of deposit, a step of heating of said material.

5. The method according to claim 1, comprising, prior to the second step of deposit, a step of coloring said material.

6. The method according to claim 1, wherein said material belongs to the family of polycaprolactones.

\* \* \* \* \*